United States Patent
Abdulkhair et al.

(10) Patent No.: US 11,827,525 B1
(45) Date of Patent: Nov. 28, 2023

(54) METHOD OF FABRICATING METAL OXIDE NANOMATERIALS USING A THERMALLY DECOMPOSABLE SOLID SUBSTRATE

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Rahamtalla Elamin, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 17/939,557

(22) Filed: Sep. 7, 2022

(51) Int. Cl.
*C01G 1/02* (2006.01)
*B09B 3/40* (2022.01)
*B82Y 40/00* (2011.01)

(52) U.S. Cl.
CPC ............. *C01G 1/02* (2013.01); *B09B 3/40* (2022.01); *B82Y 40/00* (2013.01); *C01P 2004/64* (2013.01)

(58) Field of Classification Search
CPC .. C01G 1/02; B09B 3/40; B82Y 40/00; C01P 2004/64
USPC ............................................ 423/1
See application file for complete search history.

(56) References Cited

U.S. PATENT DOCUMENTS 6,126,740 A * 10/2000 Schulz .............. H01L 21/02491
117/9

FOREIGN PATENT DOCUMENTS

CN 111545767 A 8/2020
KR 20140087963 A 7/2014

OTHER PUBLICATIONS

Abdelbasir, Sabah M. et al., "Waste-Derived Nonoparticles: synthesis Approaches, Environmental applications, and Sustainability Considerratins", Frontiers in Chemistry, Aug. 31, 2020, vol. 8, Article 782, pp. 1-18.
Nguyen-Tri, Phuong et al., "Nonocomposite Coatings: Preparation, Characterization, Properties, and Applications", hindawi International Journal of Corrosion, vol. 2018, Article ID 4749501, pp. 1-19; Feb. 13, 2018.

* cited by examiner

*Primary Examiner* — Edward M Johnson
(74) *Attorney, Agent, or Firm* — Nath, Goldberg & Meyer; Richard C. Litman

(57) ABSTRACT

The method of fabricating metal oxide nanomaterials using a thermally decomposable substrate can include combining an aqueous solution including a metal salt with a thermally decomposable solid substrate. In an embodiment, the aqueous solution can be nebulized and applied directly on the solid substrate. In an embodiment, the solid substrate can be macerated in the aqueous solution. The solid material, once combined with the aqueous solution, can then be calcined at a temperature ranging from about 400° C. to about 900° C. Calcination produces metal oxide nanoparticles and transforms the solid material into capping substrate molecules that are separated by the metal oxide ions. Thus, the metal oxide nanomaterials include capping substrate molecules separated by metal oxide nanoparticles. The present method reverses the conventional capping process by placing the metal oxide ions between the molecules of the capping substrate, which stay in place (keeping distance between ions), even during calcination.

8 Claims, No Drawings

METHOD OF FABRICATING METAL OXIDE NANOMATERIALS USING A THERMALLY DECOMPOSABLE SOLID SUBSTRATE

BACKGROUND

1. Field

The disclosure of the present patent application relates to nanotechnology, and particularly to a method of producing metal oxide nanomaterials from a thermally decomposable solid substrate.

2. Description of the Related Art

Recently, metal nanoparticles have demonstrated important uses in a variety of fields. In particular, metal nanoparticles hold promise for a myriad of applications, including thermochromics, drug delivery, communication technology, and energy conversion.

Synthesis of nanoparticles have been achieved by a variety of methods, including physicochemical, thermal decomposition, hydrothermal, sol-gel, electrochemical, microwave assisted, sonochemical, solvothermal, photosynthesis, photochemical reduction, chemical reduction and continuous-flow methods. These methods are often costly or result in agglomeration of particles.

Sol-gel and hydrothermal methods of nanoparticle synthesis, for example, were extensively applied to prepare nanoparticles using physical processes, such as colloidal dispersion. These methods typically introduced a capping material as an intermolecular spacer to prevent the agglomeration of nanoparticles. This process was generally unsuccessful, however, due to the lack of solubility of the capping material, unjust distribution, or electrostatic attraction of ions during the precipitation process.

Thus, a method of fabricating metal oxide nanomaterials using a thermally decomposable solid substrate solving the aforementioned problems is desired.

SUMMARY

The method of fabricating metal oxide nanomaterials using a thermally decomposable substrate can include combining an aqueous solution including a metal salt with a thermally decomposable solid substrate. In an embodiment, the aqueous solution can be nebulized and applied directly on the solid substrate. In an embodiment, the solid substrate can be macerated in the aqueous solution. The solid material, once combined with the aqueous solution, can then be calcined at a temperature ranging from about 400° C. to about 900° C. Calcination produces metal oxide nanoparticles and transforms the solid material into capping substrate molecules that are separated by the metal oxide ions. Thus, the metal oxide nanomaterials include capping substrate molecules separated by metal oxide nanoparticles. The present method reverses the conventional capping process by placing the metal oxide ions between the molecules of the capping substrate, which stay in place (keeping distance between ions), even during calcination.

These and other features of the method of fabricating metal oxide nanomaterials using a thermally decomposable substrate will become readily apparent upon further review of the following specification.

DETAILED DESCRIPTION OF THE PREFERRED EMBODIMENTS

The method of fabricating metal oxide nanomaterials using a thermally decomposable substrate includes combining an aqueous solution including a metal salt with a thermally decomposable solid substrate. The solid material, once combined with the aqueous solution, can then be calcined at a temperature ranging from about 400° C. to about 900° C. to produce the metal oxide nanomaterial. The metal oxide nanomaterial includes capping substrate molecules separated by metal oxide nanoparticles. The capping substrate molecules are formed from the thermally decomposable substrate.

Combining an aqueous solution including a metal salt with a thermally decomposable solid substrate can include nebulizing the aqueous solution and spraying the nebulized solution directly on the solid substrate. The aqueous solution can, for example, be directly applied on the solid substrate by mist deposition. Alternatively, the solid substrate can be macerated in the aqueous solution.

The solid substrate, once calcined, can provide a capping substrate to prevent agglomeration of the particles. The solid substrate can be selected from ashless filter paper, cellulose powder, cotton, charcoal, and tissue paper. The tissue paper can include, for example, toilet paper or waste toilet paper. When waste toilet paper is used as the capping substrate, the calcination temperatures can be about 500° C. and above. The metal oxide ions, between the molecules of the capping substrate, stay in place even during calcination. to prevent the agglomeration of nanoparticles In an embodiment, the aqueous solution including the metal salt can have a concentration ranging from about 0.001M to about 1.0M. The metal in the solution can be copper, nickel, iron, cobalt, silver, or gold, for example.

In an embodiment, the mist deposition is performed using a flame photometer nebulizer.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, a nanoparticle is a small particle that ranges from about 1 to about 100 nanometers in size.

It is to be understood that a method of fabricating metal oxide nanomaterials using a thermally decomposable substrate is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of fabricating a metal oxide nanomaterial using a thermally decomposable solid substrate, comprising:
    combining an aqueous solution of a metal salt with a thermally decomposable solid substrate to provide a composite; and
    calcining the composite to provide the metal oxide nanomaterial, the metal oxide nanomaterial including capping thermally decomposable solid substrate molecules separated by metal oxide nanoparticles.

2. The method of claim 1, wherein the step of combining the aqueous solution including a metal salt with the thermally decomposable solid substrate comprises applying the aqueous solution on the thermally decomposable solid substrate by mist deposition.

3. The method of claim 1, wherein the step of combining the aqueous solution including a metal salt with the thermally decomposable solid substrate comprises macerating the thermally decomposable solid substrate in the aqueous solution.

4. The method of claim 1, wherein the thermally decomposable solid substrate is selected from the group consisting of ashless filter paper, cellulose powder, cotton, charcoal, and tissue paper.

5. The method of claim 1, wherein the thermally decomposable solid substrate is ashless filter paper.

6. The method of claim 1, wherein the thermally decomposable solid substrate is tissue paper.

7. The method of claim 6, wherein the tissue paper comprises toilet paper.

8. The method of claim 1, wherein the step of calcining the composite further comprises calcining the composite at a temperature between about 500° C. and about 900° C.

\* \* \* \* \*